July 5, 1938.　　　　M. ROWLISON　　　　2,122,755

MOWING ATTACHMENT FOR MOTOR VEHICLES

Filed March 9, 1937　　　2 Sheets-Sheet 1

INVENTOR
MILTON ROWLISON
BY C. James Cottrell
ATTORNEY

July 5, 1938.                M. ROWLISON                2,122,755
                 MOWING ATTACHMENT FOR MOTOR VEHICLES
                 Filed March 9, 1937         2 Sheets-Sheet 2
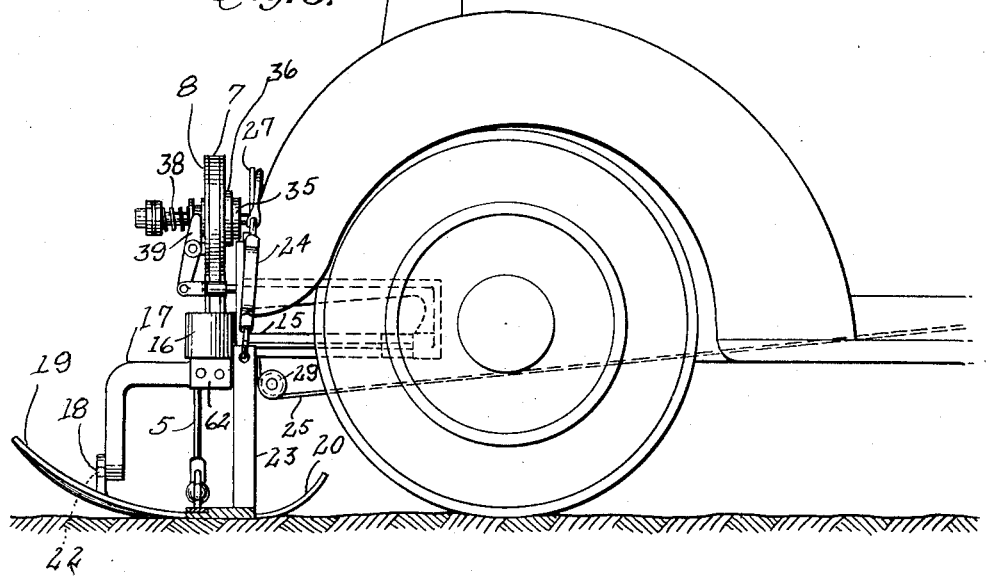
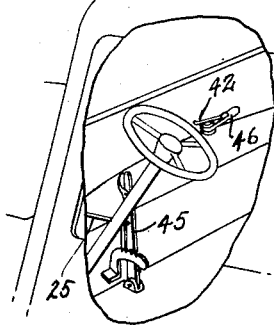
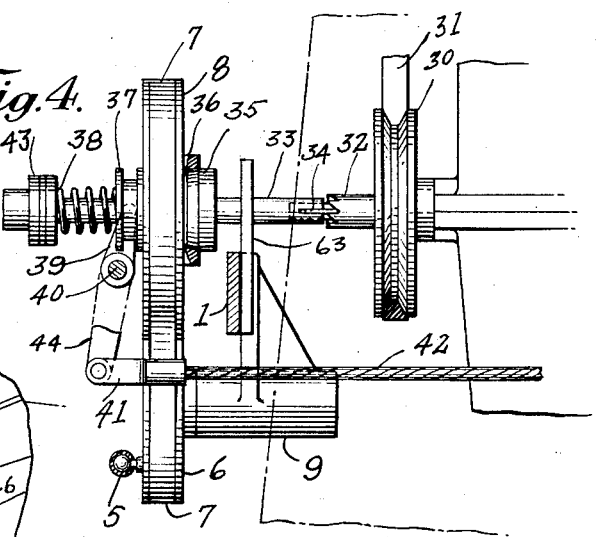
INVENTOR
MILTON ROWLISON
BY
C. James Cottrell
ATTORNEY Patented July 5, 1938

2,122,755

UNITED STATES PATENT OFFICE 2,122,755

MOWING ATTACHMENT FOR MOTOR VEHICLES

Milton Rowlison, Goshen, N. Y.

Application March 9, 1937, Serial No. 129,888

4 Claims. (Cl. 56—25)

This invention relates to hay cutting apparatus, and more particularly to the provision of an attachment by means of which hay cutting devices can be operated by standard types of automobiles.

Heretofore, hay cutting devices have been propelled by animal power, or by tractors especially designed for such purposes. The operating of hay cutters by means of horses has been found too slow and unprofitable and disadvantageous in many respects. When hay cutters are operated by tractors or the usual motorized equipment, the tractor is available only for that purpose, and remains idle when there is no hay to be cut. The small farmer, of which there are many in this country, cannot afford a tractor or otherwise motorized hay cutter and also maintain a separate automobile or truck to deliver his products, and consequently, he has had to rely upon the slow and tedious task of cutting his hay by using horses. This frequently places him at a disadvantage, as it is important that the hay be cut as rapidly as possible in order to prevent serious damage due to climatic conditions.

It is, therefore, an object of this invention to provide a device which can be readily and conveniently attached or detached from the front of an automobile or truck for operating a hay cutter of the reciprocating type, without requiring material alteration of the automobile. With my device, when the farmer has finished cutting hay for the day, he can readily detach the hay cutter and apparatus from the automobile so that the latter can be used for road service. From actual tests, it has been found that a hay cutter can be attached to or detached from my device in two minutes. By having my device available, the farmer need only maintain an automobile or truck which he can use the year round; and it is not necessary to maintain a separate tractor or motorized hay cutter which remains idle the greater part of the year.

A further object is the provision of a device attachable to the forward end of an automobile or the like for operating a standard type of reciprocating hay cutter, which device can be completely controlled from the driver's seat of the automobile, and includes means controlled from the driver's seat for raising the hay cutter when desired.

A further object is the provision of a simple and inexpensive device for readily and conveniently attaching power driven devices of various kinds to the front of standard types of automobiles without altering materially the structure of the automobile.

These and other objects are attained by the novel construction, combination and arrangement of parts hereinafter described and shown in the accompanying drawings, constituting a material part of this disclosure, and in which:

Fig. 3 is a side elevational view of the device.

Fig. 4 is a side elevational view of details of the device.

Fig. 5 is a perspective view showing the positions of controls for the device adjacent the driver's seat of an automobile.

Figure 1:
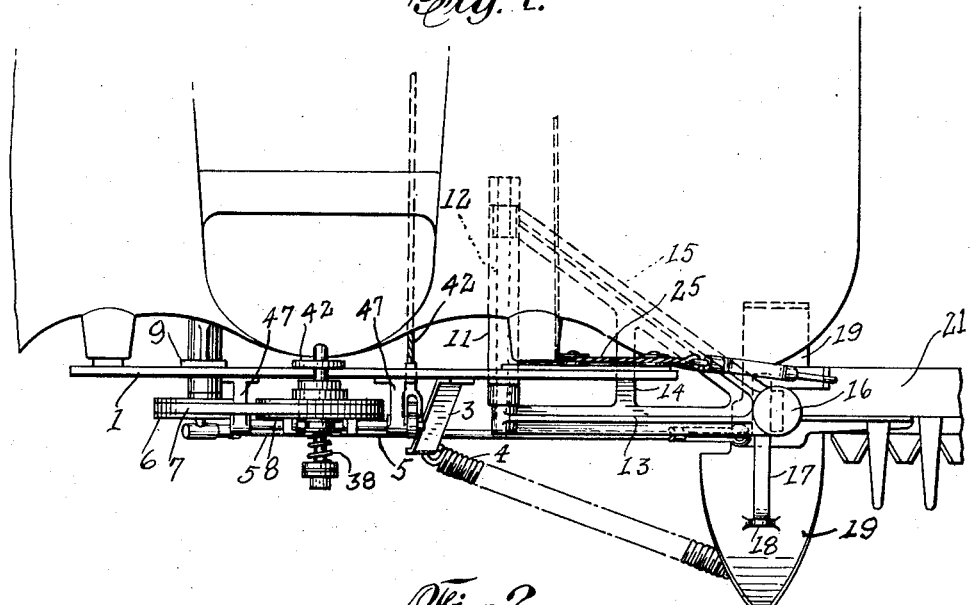
Fig. 1 is a plan view of the device attached to the front of a standard type of automobile.
Figure 2:
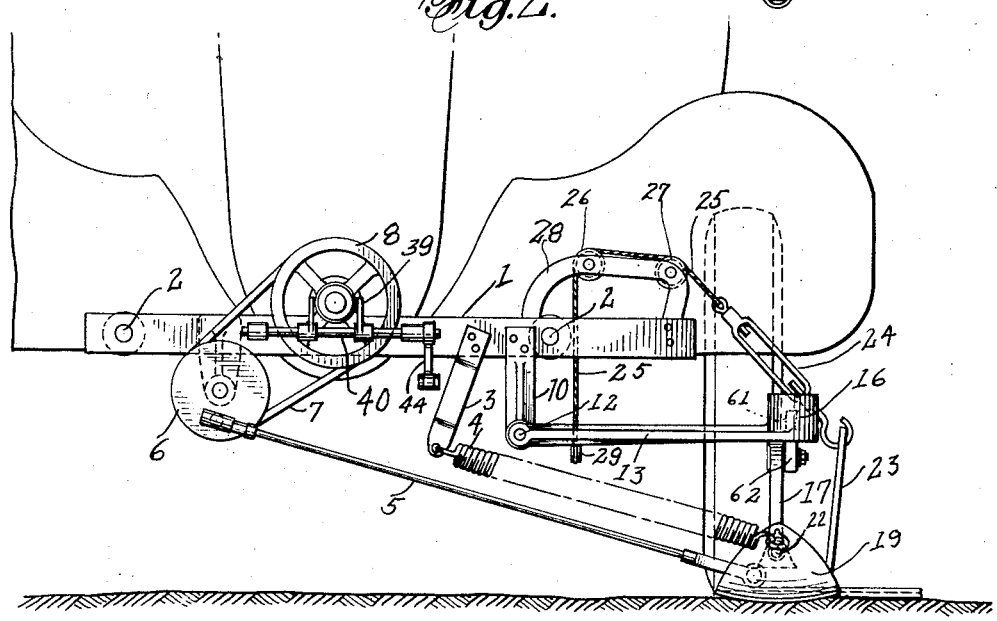
Fig. 2 is a front elevational view of the device.

Referring to the drawings, (see Figs. 1 and 2) the device is shown to comprise a cross-bar 1, which is attached to the forward end of the chassis of an automobile by means of the bolts ordinarily used for attaching a bumper to the automobile. While not shown in the drawings, a bumper can also be attached to the automobile while my device is attached thereto. Obviously, by means of the bar 1, the device can be attached to any type of automobile, regardless of the width thereof, as it is only necessary to provide holes in the bar 1 at the proper places to accommodate the particular width. The bolts 2, by means of which the bar 1 is attached, are the standard bolts of the automobile.

Attached to the bar 1, at the left side of the crankshaft of the automobile, is a bracket 3, to which is attached a coiled spring 4, which is attached to the upwardly curved forward heel shoe 19 of a hay cutter 21 of a standard reciprocating type, the particular hay cutter shown being of the left-hand type, which is a feature of my arrangement as automobiles in the United States are controlled from the left-hand side. The driver is thus enabled to have full view of the cutter and the operation thereof at all times.

A pitman 5 is attached to the reciprocating knife of the cutter 21 and to a pulley 6 rotatably mounted on a shaft journalled in a bearing 9 attached to the bar 1. A belt 7 passes over the pulley 6 and over a pulley 8, which is rotatably mounted on a stub shaft 33, (see Figs. 3, 4) which is connected by means of a key 34 to the crankshaft 32 of the automobile near the automobile pulley 30 used for driving the usual fan belt 31. The crankshafts of various types of automobile differ slightly in some respects; but such differences do not materially affect the connecting of my stub shaft 33 to any crankshaft, as is obvious.

The male member 35 of a cone clutch is fixed to the shaft 33, and the female member 36 of the clutch is attached to the pulley 8, which also has attached thereto a collar 37, by means of which the member 36 can be shifted from engagement with the male member 35. A coiled spring 38 bears against the collar 37 and a head 43 fixed to the end of the shaft 33, so that spring 38 normally maintains the clutch members 35 and 36 in engagement.

The clutch members are disengaged by the movement of an arm 39, fixed to a shaft 40, journalled in bearings 47 mounted on the bar 1, said shaft 40 having a down extending arm 44 attached thereto, pivotally connected to a member 41, to which is attached a cable 42 passing through the hood of the automobile to a position on the dashboard of the automobile adjacent the driver's seat, (see Fig. 5) where it is controlled by a lever 46.

Attached to the bar 1, on the left side of the automobile is a bracket 10 which supports a bearing 11, through which passes a pin 12, (see Fig. 1) which also passes through the ends of arms 13 and 15 of a member 14, having at the junction of the arms 13 and 15 a head 16 which rotatably receives a pin 61 projecting upwardly from a member 62, to which is attached a hanger 17, having a pin 22 rotatably receiving an upstanding stud 18 integral with the shoe 19. The rear end of the shoe is upwardly curved as shown at 20, so that when the automobile and cutter are moved backwards the cutter will not be obstructed.

Attached to the shoe is an upstanding bar 23, hooked to a turnbuckle 24, to which is attached a cable 25, passing over pulleys 26 and 27, supported by a bracket 28, mounted on the bar 1. The cable 25 passes also over a pulley 29, and is directed through the hood of the automobile to a lever 45, mounted on the floor boards of the automobile adjacent the driver's seat. When it is desired to raise the cutter 21, the lever 45 is pulled backwards, which movement first raises the outer free end of the cutter by causing a pivoting about pin 22. Further pulling on the lever 45 raises the heel shoe 19 and 20, by causing a pivoting about pin 12.

Attached to the bar 1 is an upstanding brace 63 which supports the stub shaft 33.

From the above description, it will be seen that there has been provided a simple and convenient attachment to standard types of automobiles, by means of which hay cutters of the reciprocating type can be effectively operated to enable the cutting of hay more rapidly than has heretofore been possible by means of horses or tractors. The device enables the detachment or attachment of a hay cutter in a short space of time, such as two minutes, thus rendering the motor vehicle available for use on roads for delivery and other purposes.

The foregoing disclosure is to be regarded as descriptive and illustrative only, and not as restrictive or limitative of the invention, of which obviously an embodiment can be constructed including modifications without departing from the general scope herein indicated and denoted in the appended claims.

Having thus described my invention, what I claim as new and desire to secure by Letters Patent, is:

1. In a hay cutting attachment for a standard type of automobile having longitudinal side frame members and a crank shaft, a flat crossbar of substantially uniform cross-section adapted to be adjustably attached to the extreme forward ends of the side frame members of an automobile, a first bracket attached to and depending from the bar, a first pulley rotatably supported by the bracket, a stub shaft supported by said bar and adapted to be connected to the extreme forward end of the crankshaft of the automobile, a second pulley rotatably mounted on said shaft, a clutch for connecting the second pulley to the stub shaft, a belt passing over said pulleys, a second bracket depending from said bar and having a horizontal bearing, a normally horizontal triangular member having a pair of spaced bearings in alinement with and embracing the ends of the horizontal bearing, a pivot pin passing through said bearings, a normally vertical member connected to said triangular member for rotation about a vertical axis, a hay cutter of the reciprocating type, said cutter having its inner end connected to the vertical member for rotation about a horizontal axis, and means associated with said first pulley for reciprocating the blades of said cutter.

2. The hay cutting attachment set forth in claim 1 being further characterized by the automobile having a hood and by a vertical bar attached to the inner end of the hay cutter, a cable attached to the upper end of the bar, guide pulleys for the cable supported by said flat crossbar, said cable passing through the hood of the automobile and extending to a position within the body of the automobile adjacent the driver's seat.

3. A hay cutting attachment for standard types of automobiles having longitudinal side frame members and a crank shaft, comprising a flat crossbar of substantially uniform cross-section having means to enable it to be attached to the extreme forward ends of the side frame members, a first bracket attached to and depending from said bar, a pulley rotatably mounted on said bracket, a second bracket attached to and depending from the bar and supporting a horizontal bearing, a normally horizontal member having bearings, a pin passing through said bearings so that said member is pivotally supported by said second bracket, a vertical member pivotally supported by said horizontal member for rotation about a vertical axis, a hay cutter of the reciprocating blade type having a heel shoe, said vertical member being connected pivotally to said heel shoe, a pitman connected to said pulley and the reciprocating blade of the hay cutter, and means attached to the extreme forward end of the crank shaft of the automobile for driving said pulley.

4. A hay cutting attachment for standard types of automobiles having longitudinal side frame members and a crank shaft, comprising a cross bar having means to enable it to be attached to the extreme forward ends of the side frame members, a first bracket attached to and depending from said bar, a pulley rotatably mounted on said bracket, a second bracket attached to and depending from the bar and supporting a horizontal bearing, a normally horizontal member having bearings, a pin passing through said bearings so that said member is pivotally supported by said second bracket, a vertical member pivotally supported by said horizontal member for rotation about a vertical axis, a hay cutter of the reciprocating blade type having a heel shoe, said vertical member being connected pivotally to said heel shoe, a pitman connected to said pulley and the reciprocating blade of the hay cutter, and means attached to the extreme forward end of the crank shaft of the automobile for driving said pulley.

MILTON ROWLISON.